United States Patent
Desjoyeaux et al.

(10) Patent No.: US 11,472,133 B2
(45) Date of Patent: Oct. 18, 2022

(54) LOBED TUBULAR PIECE MADE OF A COMPOSITE WITH UNIDIRECTIONAL FIBERS

(71) Applicant: Safran Nacelles, Gonfreville l'Orcher (FR)

(72) Inventors: Bertrand Desjoyeaux, Moissy Cramayel (FR); Davi Silva De Vasconcellos, Moissy Cramayel (FR); Benjamin Provost, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 326 days.

(21) Appl. No.: 16/785,979

(22) Filed: Feb. 10, 2020

(65) Prior Publication Data

US 2020/0180238 A1 Jun. 11, 2020

Related U.S. Application Data

(63) Continuation of application No. PCT/FR2018/052058, filed on Aug. 10, 2018.

(30) Foreign Application Priority Data

Aug. 10, 2017 (FR) ...................................... 1757637

(51) Int. Cl.
*B29C 33/68* (2006.01)
*B29C 70/32* (2006.01)
(Continued)

(52) U.S. Cl.
CPC ............ *B29C 70/222* (2013.01); *B29C 33/68* (2013.01); *B29C 70/32* (2013.01);
(Continued)

(58) Field of Classification Search
None
See application file for complete search history.

(56) References Cited

U.S. PATENT DOCUMENTS 4,541,886 A * 9/1985 Marlow ................ B29C 70/388
156/574
5,213,646 A * 5/1993 Zsolnay ................ B29C 70/382
156/169

(Continued)

FOREIGN PATENT DOCUMENTS

| EP | 0198744 A1 * | 10/1986 |
| FR | 2651717 | 3/1991 |
| GB | 2484349 | 4/2012 |

OTHER PUBLICATIONS

Machien Translation of EP 0198744, Date Unknown.*
International Search Report for International Application PCT/FR2018/052058, dated Dec. 7, 2018.

*Primary Examiner* — Jeffry H Aftergut
(74) *Attorney, Agent, or Firm* — Burris Law, PLLC

(57) ABSTRACT

A method for manufacturing a fibrous tubular structure including lobes, in which fibers are draped/deposited on a mandrel having a shape corresponding to that of the fibrous structure, includes draping/deposition carried out such that at least one group of fibers has a same orientation with respect to the axis (A) of said fibrous structure, then, the fibers having been draped over an angular sector less than the total periphery of the mandrel, one of the ends of the fibrous structure is separated from the mandrel in order to allow the continuation of the draping on the same mandrel.

11 Claims, 1 Drawing Sheet

(51) Int. Cl.
    *B29C 70/22*     (2006.01)
    *C04B 35/628*   (2006.01)
    *C04B 35/64*    (2006.01)
    *C04B 35/80*    (2006.01)
    *C08J 5/24*     (2006.01)
    *B29L 23/00*    (2006.01)
    *F02K 1/44*     (2006.01)

(52) U.S. Cl.
    CPC ........ *C04B 35/62844* (2013.01); *C04B 35/64* (2013.01); *C04B 35/80* (2013.01); *C08J 5/24* (2013.01); *B29L 2023/00* (2013.01); *C04B 2235/5256* (2013.01); *C04B 2235/6028* (2013.01); *F02K 1/44* (2013.01); *F05D 2230/20* (2013.01); *F05D 2300/603* (2013.01)

(56) References Cited

U.S. PATENT DOCUMENTS

2007/0213136 A1*  9/2007  Borges .................... F16C 3/023
                                                        464/181
2013/0118247 A1*  5/2013  Akbari ................. F04C 2/1075
                                                       156/244.11

\* cited by examiner

LOBED TUBULAR PIECE MADE OF A COMPOSITE WITH UNIDIRECTIONAL FIBERS

CROSS-REFERENCE TO RELATED APPLICATIONS

This application is a continuation of International Application No. PCT/FR2018/052058, filed on Aug. 10, 2018, which claims priority to and the benefit of FR 17/57637 filed on Aug. 10, 2017. The disclosures of the above applications are incorporated herein by reference.

FIELD

The present disclosure relates to a circular fibrous structure with lobes, as well as to a tubular piece with lobes embedding the fibrous structure.

BACKGROUND

The statements in this section merely provide background information related to the present disclosure and may not constitute prior art.

Circular fibrous structures with lobes can be used in particular in the aeronautical industry, for example, a flow mixer intended to equip the trailing edge of a bypass turbojet engine nozzle, separating the hot and cold air flows, in order to promote the mixing of these flows in order to increase the thrust and reduce noise emissions.

Such a flow mixer substantially has an axial symmetry around the main axis of the turbojet engine, and typically includes upstream (with respect to the air flow direction), a circular shroud, and downstream lobes which get larger up to the trailing edge.

In the prior art, such a flow mixer can be obtained from a plurality of woven fibers laps that overlap at least partially, which requires multiple cutting (and therefore many scraps) and a complex implementation by hand.

In addition, the overlapping of the different laps generates increased weight, as well as aerodynamic discontinuities, which is inefficient in terms of fuel consumption and acoustics.

Alternatively, such a flow mixer can be produced by contour weaving, that is to say by means of a fiber fabric which is wound around a mandrel with a shape corresponding to that of the mixer, before winding it on a tool replicating the shape of the mixer.

Such a method allows in particular obtaining, on the final piece, fibers having a well-defined orientation with respect to the axis of the piece.

Nonetheless, when it is desired to implement such a contour weaving method, in particular with a ceramic fiber fabric, it is necessary to use ceramic fibers with a reduced cross-section, called "low grade", which cost is very high, and the choices of orientation of the fibers are limited to those compatible with the looms.

This issue is encountered with other fibers, such as polymer fibers, or metallic fibers.

SUMMARY

This section provides a general summary of the disclosure and is not a comprehensive disclosure of its full scope or all of its features.

The present disclosure aims at providing a mixer with fibers, in particular ceramic fibers, with reduced manual intervention during manufacture, which is less expensive.

The present disclosure provides a circular fibrous structure with lobes, remarkable in that the circular fibrous structure is formed in one piece from a non-woven fibrous structure on at least two lobes, the fibrous structure comprising at least one group of fibers having the same orientation with respect to the axis of said structure.

In the context of the present disclosure, the term "circular" or "tubular" should be understood as a structure extending over part or all of a circumference.

The fibrous structure according to the present disclosure, reduces an implementation of a plurality of fibers laps as has been the case in the prior art, and thus gain in implementation speed, cost, and in-flight performance.

In addition, the use of a non-woven fibrous structure comprising at least one group of fibers having the same orientation with respect to the axis of the fibrous structure (these fibers will be referred to as "unidirectional") makes it possible to control the stress/load paths inside the structure, and thus improve the design of the final piece, in particular in terms of weight, while offering a less expensive alternative compared to the use of woven fibers.

It is thus possible, for example, to use 20,000 denier oxide fibers, which are difficult to weave.

According to other optional features of the fibrous structure according to the present disclosure, considered alone or in combination:

The fibrous structure comprises between two lobes and up to a plurality of lobes, The fibrous structure comprises lobes with different shapes. The fibrous structure comprises several partially or entirely superimposed non-woven non-fibrous structures. The fibrous structure comprises several juxtaposed non-woven fibrous structures. The fibrous structure comprises fibers having a multitude of orientations, depending on the mechanical and structural requirements.

The fibers are selected from: ceramic fibers such as silicon carbide, aluminum oxides, and aluminosilicates, fibers made of polymers such as polyester, polyamide, polyethylene, mineral fibers such as glass or basalt fibers, organic fibers such as carbon or aramid fibers, Kevlar®, and metallic fibers, being understood that any combination of these fibers is possible.

The fibrous structure is obtained by drape-molding/depositing the fibers on a mandrel whose shape corresponds at least partially to that of the final piece to be made, and on which, for example, a film has been previously wound so as to surround said mandrel.

The present disclosure also relates to a composite piece obtained from a fibrous structure in accordance with the foregoing.

According to other optional features of the piece according to the present disclosure, considered alone or in combination: the material(s) forming the matrix of said fibers is an organic matrix or a ceramic matrix, the piece comprises lobes having different shapes, the piece comprises lobes whose height and shape are variable depending on the axial position, the sidewalls of the lobes are according to any planes or in any shape, and the perimeter of the piece in the area of the lobes is larger than the smallest circumference of the piece in the area without lobes. The piece has an open portion, in which an angular sector is missing.

The present disclosure also relates to a flow mixer for an aircraft turbojet engine, which is remarkable in that the flow mixer is formed by a piece in accordance with the foregoing.

The present disclosure also relates to a method for manufacturing a tubular fibrous structure with lobes, in which fibers are drape-molded/deposited on a mandrel having a shape corresponding to that of the fibrous structure, the drape-molding/deposition being performed so that at least one group of fibers has the same orientation with respect to the axis of said fibrous structure, then once the fibers have been drape-molded over an angular sector smaller than the total periphery of the mandrel, one of the ends of the fibrous structure is separated/detached from the mandrel, to enable further drape-molding on the same mandrel.

This technique allows the drape-molding machine to continue depositing the fibers on the mandrel continuously and thus allows obtaining a preform whose total length is longer than the periphery of the mandrel.

The mandrel has a shape corresponding to that of the fibrous structure, that is to say that the mandrel has a shape corresponding, at least partially on a given portion, to that of the final piece to be produced. In other words, the shape of the mandrel is such that the shape of the preform drape-molded thereon also fits to the shape of the desired final piece.

For example, the mandrel may have the exact shape of the final piece to be produced. Alternatively, in another configuration, the mandrel has a reduced shape which is arranged so that the mandrel corresponds, or fits, substantially to that of a portion of the desired final piece considered over a predetermined angular sector. Thus, if the mandrel is reduced for example by a factor of 4 compared to the dimension of the final piece to be manufactured, the drape molding/depositing machine continues the deposition of the fibers on the mandrel continuously over four revolutions of the mandrel to obtain the adapted fibrous structure. The amount of deposition depends on the repetition of shape of the lobes of the tubular piece to be manufactured, to the extent that the shape of said lobes created by a revolution of the mandrel is repeated.

The present disclosure is particularly advantageous, less expensive, less bulky, and produces a preform whose total length is longer than the periphery of the mandrel. The present disclosure also allows using identical mandrels to manufacture fibrous structures with different dimensions, in length, in width, in orientations and arrangements of contained fibers.

In a specific variant, the mandrel has a geometry such that the circumference of the mandrel corresponds to the shape of a portion of a fibrous structure comprising an area substantially of revolution and an area forming at least two lobes.

In other words, for example, to produce in one piece a fibrous structure covering all or part of an open or closed circular piece including N lobes around a longitudinal axis, these lobes being uniformly distributed angularly around the axis and with an identical shape at least one lobe out of two (at least the odd lobes with a similar shape between them and the even lobes with a similar shape between them), a preform is drape-molded according to the present disclosure continuously over N/2 (N divided by 2) revolutions of a circular mandrel, the mandrel including at one of the ends of the mandrel two bosses, and in that the entire surface constituting the total circumference (one revolution) of the mandrel corresponds by wire transposition to the shape of the final piece corresponding to an angular sector covering two lobes thereof.

In one variant, prior to the drape-molding/deposition step, a separation film is applied/wound, in one form by conformation, on the mandrel, the film then being between said mandrel and the fibrous structure during manufacture.

The film is separated from the mandrel at the same time as the fibrous structure on which the film is then supported, facilitating the maintenance of cohesion between parallel fibers.

In some forms, the length of film wound on the mandrel is at least equal to the dimension, or total length, of the fibrous structure to be manufactured. Thus, for example, prior to the step of drape-molding/deposition the fibers on the mandrel, the film is wound up over at least as many revolutions around the mandrel as is desired for the fibrous structure to be made in one piece.

For example, if is desired to make a preform that achieves in one piece a total length equivalent to 5 revolutions of mandrels, in one form the film has been previously wound continuously over at least 5 revolutions, thus, as the film is removed with the preform, there is always a film underneath to receive the rest of the fibrous structure forming the preform.

The separation of the film and the fibers may also be carried out subsequently, for example during the winding of the fibrous structure around the tubular form with scrolls.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
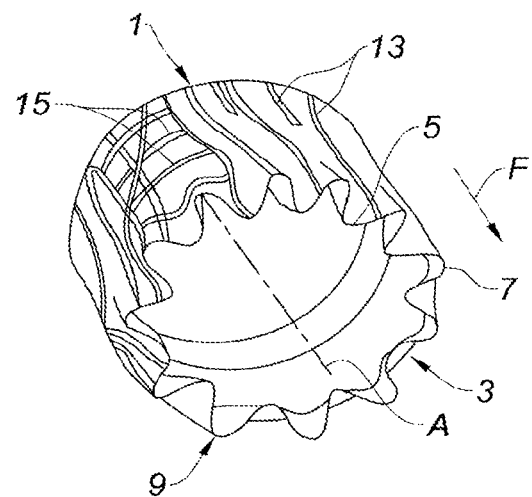
FIG. 1 represents a perspective view of a flow mixer for a turbojet engine according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In FIG. 1, there is represented a mixer for an aircraft turbojet engine, centered around a longitudinal axis A.

Such a mixer typically comprises an upstream portion 1 (with respect to the direction of the air flow in operation, indicated by the arrow F) with a substantially circular cross-section, and a downstream portion 3 having recesses 5 and bosses 7, commonly called lobes 9.

Such a mixer is intended to be disposed on the trailing edge of the nozzle separating the cold air flow from the hot air flow of an aircraft bypass turbojet engine, in order to achieve a better mixing of these two flows, and thus improve the acoustic performance and the consumption of the engine.

Figure 2:
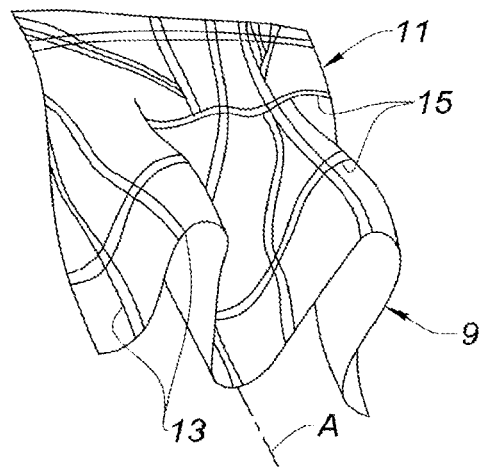
FIG. 2 represents a perspective view of a portion of the fibrous structure covering two lobes of the mixer of FIG. 1.

According to the present disclosure, the mixer is made with a fibrous structure 11, shown more particularly in FIG. 2, formed of one or several non-woven fibrous structure(s) in particular with ceramic fibers, each non-woven fibrous structure comprising at least one group of fibers having the same orientation with respect to the axis A (the fibers of each such group being designated as "unidirectional").

The term "unidirectional" means overall layers of fibers or filaments disposed in wicks or laps and substantially parallel to each other.

In FIG. 2, there is shown a first group of fibers 13 oriented with respect to the direction of the longitudinal axis A, and a second group of fibers 15 oriented with respect to a direction transverse to the axis.

In another form, the fibrous structure 11 extends over all of the lobes of the mixer, possibly making several revolutions. In this way, the fibrous structure of the mixer is made in one piece, which avoids cutting and partially superimposing laps of fibrous structure as has been the case in the prior art.

The fibrous structure may include between two lobes and up to a plurality of lobes, and these lobes may have different shapes.

This fibrous structure may comprise several non-woven fibrous structures partially or totally superimposed or juxtaposed relative to each other.

This fibrous structure may comprise fibers having a multitude of orientations, depending on mechanical and structural requirements.

The material(s) forming said fibers are selected in particular from the group comprising glass, basalt, carbon, silicon carbide, aluminum oxides, aluminosilicates.

In one form, the final piece obtained from the fibrous structure comprises an organic matrix or a ceramic matrix.

The impregnation of the fiber by the matrix may be carried out at the level of a unidirectional ribbon of fibers before the deposition in the case of the so-called "pre-impregnated" methods and followed, after final winding on the tubular shape with scrolls, by a polymerization curing, or in the case of ceramic matrices by sintering or densification.

The impregnation with the matrix may also be completed or completely carried out after the drape-molding on the tubular shape with scrolls by the RTM (Resin Transfer Molding) method, infusion, and more generally by any method allowing embedding the fibers of the preform in a resin suitable for polymerization curing, or in the case of ceramic matrices by sintering or densification.

The mixer obtained with the fibrous structure according to the present disclosure may have lobes whose height is continuously increasing towards the downstream end of the piece.

The sidewalls of the lobes may be according to any planes or in any shape.

The mixer may have an open portion, in which an angular sector is missing.

Figure 3:
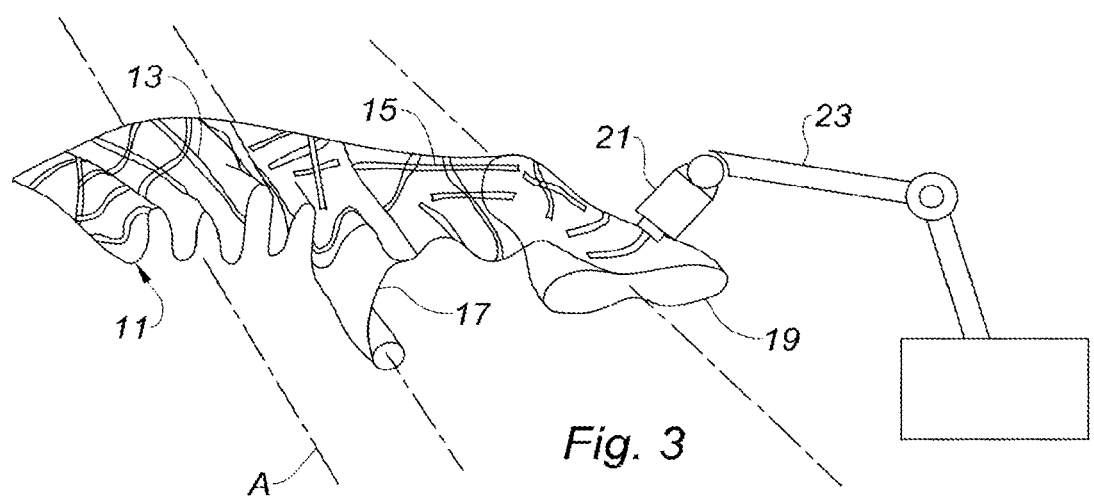
FIG. 3 illustrates a method for manufacturing the fibrous structure of FIG. 2.

In FIG. 3, there is schematically represented a method for manufacturing the fibrous structure 11 of FIG. 1.

As shown, a film 17 has been wound over several revolutions around a take-up mandrel 19.

This mandrel is a kind of spool with a particular shape corresponding to the shape of the fibrous structure 11 to be made.

By a fiber deposition head 21 mounted for example at the end of the arm 23 of a robot, the fibers having the different desired orientations with respect to the axis A of the tubular final piece are drape-molded/deposited over the film 17. Accordingly, a non-woven fibrous structure composed of unidirectional fibers is thus obtained.

Once the fibers have been drape-molded over an angular sector smaller than the total periphery of the mandrel, one of the ends of the film 17 is detached from the mandrel, freeing the surface of the mandrel from the already drape-molded preform portion, in order to enable further drape-molding on the same mandrel and following the already drape-molded fibrous preform.

Depending on the shape repetition of the lobes of the tubular piece, each fibrous structure may cover from 2 lobes or up to a full revolution or more than one revolution of the tubular piece.

In particular, if the lobes are identical or if one out of two of the lobes are identical, it will be possible to constitute a full revolution at least of the piece with lobes with the same fibrous structure.

Before or after winding on the molding tool whose shape corresponds to that of the final piece, the fibrous structure 11 may be impregnated with the material intended to form the composite matrix before being cured so as to obtain the final piece, namely the flow mixer.

Following that is the curing of the matrix to stiffen the piece.

Of course, the present disclosure is not limited to the described and represented form provided as an illustrative and non-limiting example.

For example, such a mixer may also be used to mix two concentric flows in different fields (hydraulic or gas, without necessarily being hot, but with the same concerns for mixing, cost, etc.). The fibrous structure may be made of ceramic, organic (polyester, polyamide, polyethylene, etc.) metallic, glass, basalt, carbon, silicon carbide, aluminum oxides, aluminosilicates fibers.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for manufacturing a tubular fibrous structure with lobes, the method comprising:
    drape-molding/depositing fibers on a mandrel having a shape corresponding to that of the tubular fibrous structure, the drape-molding/depositing being performed so that at least one group of fibers has a same orientation with respect to a longitudinal axis (A) of said tubular fibrous structure,
    wherein fibers from the at least one group of fibers are drape-molded/deposited over an angular sector smaller than a total periphery of the mandrel to form a discrete segment of fibers on the angular sector, an end of the fibrous structure being separated from the mandrel in order to enable further drape-molding on the mandrel and formation of the tubular fibrous structure with lobes.

2. The method according to claim 1, wherein a circumference of the mandrel corresponds to a shape of a portion of a fibrous structure comprising an area of revolution and an area forming at least two lobes.

3. The method according to claim 1, wherein the mandrel has a reduced shape corresponding, or fitting, to that of a portion of a final piece over a predetermined angular sector.

4. The method for manufacturing according to claim 1, wherein prior to drape-molding/depositing the fibers on the mandrel, a separation film is wound on the mandrel.

5. The method for manufacturing according to claim 4, wherein the separation film is separated from the mandrel at a same time as the tubular fibrous structure on which the separation film is supported.

6. The method for manufacturing according to claim 1 further comprising:
impregnating the fibers by a matrix in the form of a unidirectional ribbon of fibers before the drape-molding/depositing; and
after final winding of the fibers onto a tubular shape, curing by polymerization, or in the case of ceramic matrices by sintering or densification.

7. The method for according to claim 6, wherein the impregnation with the matrix occurs after the drape-molding/depositing over the tubular shape,
wherein fibers embedded in a preform are in a resin adapted to be cured by polymerization.

8. The method for manufacturing according to claim 6, wherein a material forming the matrix is an organic matrix or a ceramic matrix.

9. The method for manufacturing according to claim 1, wherein a composite piece obtained from the tubular fibrous structure has an open portion, in which an angular sector is missing.

10. The method for manufacturing according to claim 1, further comprising separating the end of the fibrous structure from the mandrel and drape-molding/depositing another group of fibers onto the mandrel.

11. The method for manufacturing according to claim 1, further comprising drape-molding/depositing fibers from the at least one group of fibers to form at least one of the lobes of the tubular fibrous structure.

* * * * *